(12) United States Patent
Johns et al.

(10) Patent No.: US 10,906,445 B2
(45) Date of Patent: Feb. 2, 2021

(54) CONSOLE-MOUNTED DEPLOYABLE WORK SURFACE

(71) Applicant: Ford Global Technologies, LLC, Dearborn, MI (US)

(72) Inventors: Ian S. Johns, Woodhaven, MI (US); Francesco DiDato, Allen Park, MI (US); Glen D. Skinner, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 243 days.

(21) Appl. No.: 15/951,796

(22) Filed: Apr. 12, 2018

(65) Prior Publication Data
US 2019/0315258 A1    Oct. 17, 2019

(51) Int. Cl.
| | | |
|---|---|---|
| *B60N 3/00* | (2006.01) | |
| *B60R 7/04* | (2006.01) | |
| *E05D 3/12* | (2006.01) | |
| B60R 11/00 | (2006.01) | |
| B60N 2/75 | (2018.01) | |
| B43L 3/00 | (2006.01) | |

(52) U.S. Cl.
CPC ............... *B60N 3/002* (2013.01); *B60R 7/04* (2013.01); *E05D 3/125* (2013.01); *B43L 3/008* (2013.01); *B60N 2/793* (2018.02); *B60R 2011/0007* (2013.01)

(58) Field of Classification Search
CPC .......... B60N 3/001; B60N 3/002; B60N 2/75; B60N 2/79; B60N 2/793; B60R 7/04; B60R 2011/0007; B43L 3/008

USPC ....... 296/153, 1.09, 24.34, 37.5, 37.8, 37.14
See application file for complete search history.

(56) References Cited

U.S. PATENT DOCUMENTS

| | | | | |
|---|---|---|---|---|
| 2,701,173 A | * | 2/1955 | Senior | B64D 43/00 |
| | | | | 108/43 |
| 2,797,739 A | | 7/1957 | Orsini | |
| 4,993,785 A | * | 2/1991 | Dunand | B42D 5/005 |
| | | | | 248/224.61 |
| 5,987,704 A | * | 11/1999 | Tang | G06F 1/1681 |
| | | | | 16/342 |
| 6,032,587 A | | 3/2000 | Salenbauch et al. | |
| 6,220,660 B1 | | 4/2001 | Bedro et al. | |
| 6,761,388 B2 | | 7/2004 | Lein et al. | |
| 6,786,523 B2 | * | 9/2004 | Ogura | B60N 3/102 |
| | | | | 224/281 |
| 6,851,736 B1 | * | 2/2005 | Klopp, III | B60R 7/04 |
| | | | | 224/926 |
| 7,011,273 B1 | * | 3/2006 | Stanford | B60N 3/102 |
| | | | | 224/275 |
| 7,114,755 B1 | | 10/2006 | Sturt et al. | |
| 7,455,016 B2 | | 11/2008 | Perin | |

(Continued)

FOREIGN PATENT DOCUMENTS

| | | | | | |
|---|---|---|---|---|---|
| CH | | 110694 A | * | 7/1925 | ............. B43L 3/008 |
| DE | 102013015854 A1 | | | 3/2015 | |

(Continued)

*Primary Examiner* — Hilary L Gutman
(74) *Attorney, Agent, or Firm* — David Coppiellie; Price Heneveld LLP (57) ABSTRACT

A work surface for a vehicle includes a first leaf, a second leaf, and a dual-stage hinge pivotably coupling the first and second leafs. The dual-stage hinge includes a first pivot axis and a second pivot axis.

20 Claims, 9 Drawing Sheets

(56) References Cited

U.S. PATENT DOCUMENTS

| | | | | |
|---|---|---|---|---|
| 8,385,991 | B2 * | 2/2013 | Wang | E05D 3/18 |
| | | | | 16/221 |
| 8,714,613 | B1 * | 5/2014 | Gillis | B60R 7/04 |
| | | | | 296/24.34 |
| 9,428,118 | B1 * | 8/2016 | Rawlinson | B60N 3/001 |
| 9,657,772 | B2 * | 5/2017 | Bozio | B60N 2/809 |
| 9,849,819 | B2 | 12/2017 | Farooq et al. | |
| 10,189,414 | B1 * | 1/2019 | Huebner | B60R 7/04 |
| 10,308,292 | B1 * | 6/2019 | Shedden | B60N 3/001 |
| 10,414,313 | B2 * | 9/2019 | Farooq | B60R 7/04 |
| 2002/0005424 | A1 * | 1/2002 | Lange | B60R 7/04 |
| | | | | 224/539 |
| 2002/0089217 | A1 * | 7/2002 | Scheerhorn | B60R 7/04 |
| | | | | 297/188.19 |
| 2002/0170470 | A1 * | 11/2002 | Cheng | B60N 3/002 |
| | | | | 108/69 |
| 2003/0107228 | A1 * | 6/2003 | Ono | B60R 7/04 |
| | | | | 296/24.34 |
| 2003/0127877 | A1 * | 7/2003 | Luginbill | B60N 3/10 |
| | | | | 296/37.8 |
| 2003/0128840 | A1 * | 7/2003 | Luginbill | B60R 11/0241 |
| | | | | 379/455 |
| 2003/0155787 | A1 * | 8/2003 | Lein | B60N 3/002 |
| | | | | 296/24.34 |
| 2006/0066118 | A1 * | 3/2006 | Radu | B60R 7/04 |
| | | | | 296/37.8 |
| 2006/0071497 | A1 * | 4/2006 | Radu | B60N 3/102 |
| | | | | 296/24.34 |
| 2006/0220425 | A1 * | 10/2006 | Becker | A47C 7/70 |
| | | | | 297/188.16 |
| 2008/0061575 | A1 * | 3/2008 | Mahaffy | B60R 7/043 |
| | | | | 296/24.34 |
| 2009/0199361 | A1 * | 8/2009 | Kao | E05D 11/06 |
| | | | | 16/225 |
| 2010/0187357 | A1 * | 7/2010 | Funke | B64D 11/06 |
| | | | | 244/118.6 |
| 2012/0309470 | A1 * | 12/2012 | Park | G06F 1/1681 |
| | | | | 455/575.3 |
| 2013/0016492 | A1 * | 1/2013 | Wang | E05D 3/18 |
| | | | | 361/820 |
| 2013/0187525 | A1 * | 7/2013 | Chuang | G06F 1/1681 |
| | | | | 312/326 |
| 2015/0047152 | A1 * | 2/2015 | Cheng | E05D 3/122 |
| | | | | 16/354 |
| 2015/0343956 | A1 * | 12/2015 | Hipshier | B60N 2/90 |
| | | | | 296/37.8 |
| 2015/0375639 | A1 * | 12/2015 | Yin | B60N 2/14 |
| | | | | 297/157.1 |
| 2015/0375640 | A1 * | 12/2015 | Yin | B60N 2/206 |
| | | | | 297/157.1 |
| 2016/0280128 | A1 * | 9/2016 | Cannon | B60R 13/0262 |
| 2017/0135468 | A1 * | 5/2017 | Johnson | A47B 23/02 |
| 2018/0251057 | A1 * | 9/2018 | Bywaters | B60N 3/001 |
| 2019/0031114 | A1 * | 1/2019 | Line | B60N 2/206 |

FOREIGN PATENT DOCUMENTS

| | | | | |
|---|---|---|---|---|
| KR | 20090008795 U | * | 9/2009 | |
| TW | 201438551 A | * | 10/2014 | |
| TW | 510387 U | * | 10/2015 | |
| WO | WO-2019147277 A1 | * | 8/2019 | G06F 1/1616 |

* cited by examiner

CONSOLE-MOUNTED DEPLOYABLE WORK SURFACE

FIELD OF THE DISCLOSURE

The present disclosure generally relates to a deployable work surface. More specifically, the present disclosure relates to a console-mounted deployable work surface.

BACKGROUND OF THE INVENTION

Many industries utilize transportation vehicles as mobile offices. For example, delivery drivers, contractors, and various other tradesmen are constantly moving from one appointment or delivery to the next. Paperwork of various types is frequently completed between appointments or deliveries. Completion of this paperwork can be difficult and uncomfortable when improvising a work surface in the vehicle.

SUMMARY OF THE INVENTION

According to a first aspect of the present disclosure, a work surface for a vehicle includes a first leaf, a second leaf, and a dual-stage hinge pivotably coupling the first and second leafs. The dual-stage hinge includes a first pivot axis and a second pivot axis.

Embodiments of the first aspect of the present disclosure can include the following features:
  the first leaf is movable between a stowed position and a deployed position relative to the second leaf by pivotable motion about the dual-stage hinge;
  the pivotable motion about the dual-stage hinge is accomplished by a first ninety-degree (90°) rotation about the first pivot axis and a second ninety-degree (90°) rotation about the second pivot axis in the same direction as the first ninety-degree (90°) rotation;
  the deployed position of the first leaf results in a presented surface of the first leaf being substantially coplanar with a presented surface of the second leaf;
  a presented surface of the dual-stage hinge when the first leaf is in the deployed position is substantially coplanar with the presented surfaces of the first and second leafs;
  the presented surfaces of the first leaf, the second leaf, and the dual-stage hinge provide a substantially continuous work area;
  the presented surface of the dual-stage hinge is configured to be utilized as at least a portion of the work area; and
  the first leaf and the second leaf are vertically disposed relative to one another when in a stowed position.

According to a second aspect of the present disclosure, a floor console for a vehicle includes a work surface. The work surface includes first and second leafs pivotably coupled by a dual-stage hinge. The dual-stage hinge includes first and second pivot axes. The first leaf, the second leaf, and the dual-stage hinge provide substantially coplanar presented surfaces when in a deployed position. The presented surface of the dual-stage hinge forms at least a portion of a work area.

Embodiments of the second aspect of the present disclosure can include any one or a combination of the following features:
  the first leaf is movable between a stowed position and the deployed position relative to the second leaf by pivotable motion about the dual-stage hinge;
  the pivotable motion about the dual-stage hinge is accomplished by a first ninety-degree (90°) rotation about the first pivot axis and a second ninety-degree (90°) rotation about the second pivot axis in the same direction as the first ninety-degree (90°) rotation;
  the presented surfaces of the first leaf, the second leaf, and the dual-stage hinge provide the work area as substantially continuous;
  the work surface is incorporated into a lid assembly of a main storage bin; and
  the lid assembly further includes a first latch mechanism that releases the lid assembly to permit access to the main storage bin and a second latch mechanism that releases the first leaf from a stowed position.

According to a third aspect of the present disclosure, a vehicle includes a floor, a floor console coupled to the floor, and a work surface coupled to the floor console. The work surface includes first and second leaf's pivotably coupled by a dual-stage hinge. The dual-stage hinge includes first and second pivot axes. The first leaf is operable between a stowed position and a deployed position by pivotable motion about the dual-stage hinge. The pivotable motion about the dual-stage hinge is accomplished by a first ninety-degree (90°) rotation about the first pivot axis and a second ninety-degree (90°) rotation about the second pivot axis in the same direction as the first ninety-degree (90°) rotation. The first leaf, the second leaf, and the dual-stage hinge provide substantially coplanar presented surfaces when in the deployed position. The presented surface of the dual-stage hinge is utilized as at least a portion of a work area.

Embodiments of the third aspect of the present disclosure can include any one or a combination of the following features:
  the presented surfaces of the first leaf, the second leaf, and the dual-stage hinge provide the work area as substantially continuous;
  the work surface is incorporated into a lid assembly of a main storage bin;
  the lid assembly includes a first latch mechanism that releases the lid assembly to permit access to the main storage bin and a second latch mechanism that releases the first leaf from a stowed position;
  the first leaf and the second leaf are made from a translucent material and the first leaf is additionally slidably coupled to the lid assembly; and
  slidable actuation of the first leaf from a retracted position to an extended position reveals a first leaf storage compartment.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
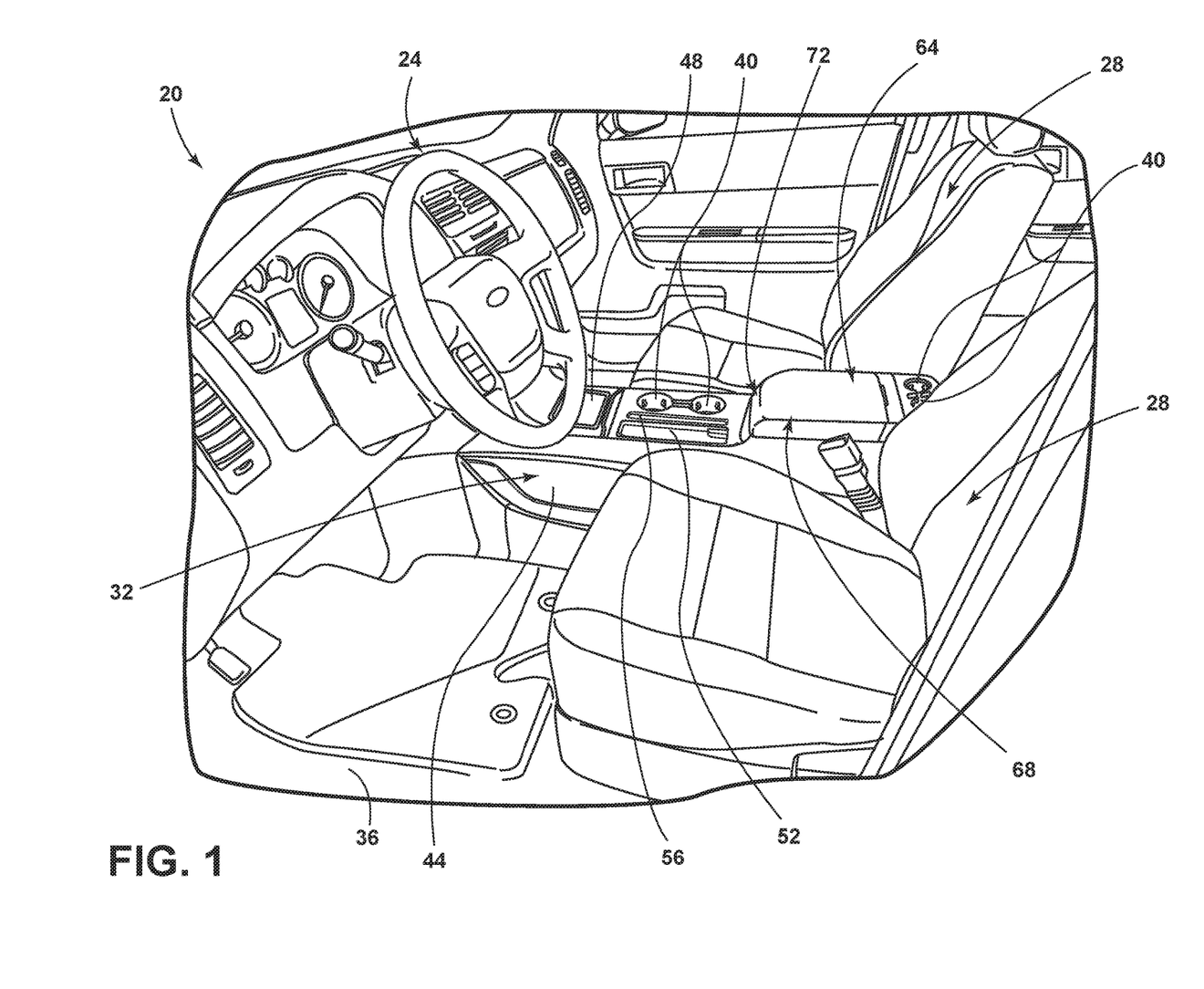
FIG. 1 is a side perspective view of a cabin of a vehicle, illustrating a floor console.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a deployable work surface. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
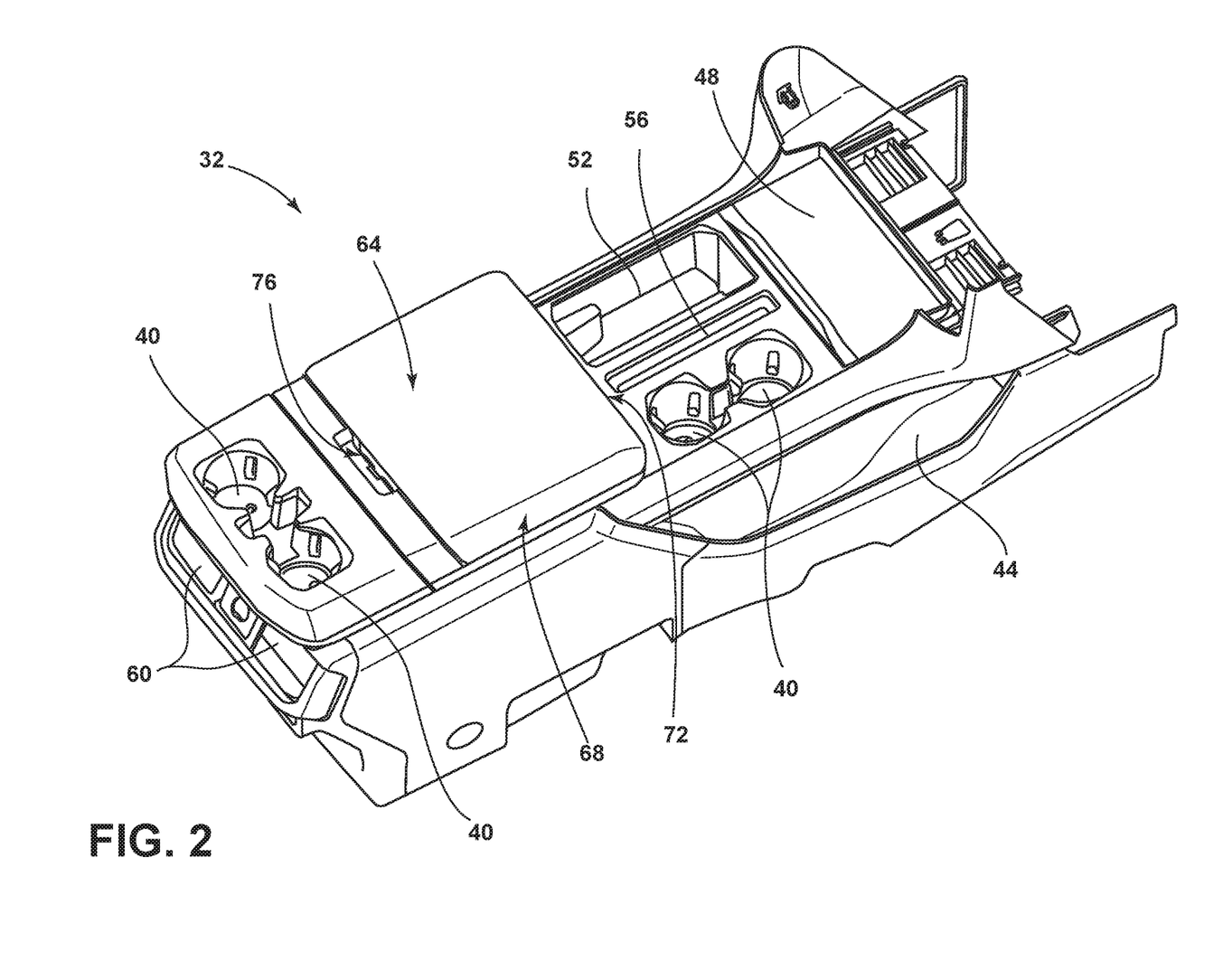
FIG. 2 is a top perspective view of the floor console, illustrating a lid assembly of a main storage bin in a closed position.

Referring to FIGS. 1 and 2, a vehicle is generally designated by reference numeral 20. The vehicle 20 includes a cabin 24 that is provided with a seating assembly 28 positioned on either side of a floor console 32. The floor console 32 may be directly coupled to a floor 36 of the vehicle 20. The floor console 32 is equipped with a plurality of storage solutions. The storage solutions include, but are not limited to, beverage holders 40, one or more map pockets 44, a sunglasses compartment 48, a first instant-access compartment 52, a second instant-access compartment 56, air vents 60, and a main storage bin 64. The main storage bin 64 is covered by a lid assembly 68. The lid assembly 68 may be actuated between an open and a closed position to permit access to the main storage bin 64. Access to the main storage bin 64 may be achieved by actuation of a first latch mechanism 72 that is positioned on a vehicle-forward portion of the lid assembly 68. The lid assembly 68 may be provided with a padded and soft exterior surface when in the closed position, such that a user may utilize the lid assembly 68 as an armrest in a more comfortable manner. A second latch mechanism 76 may be positioned on a vehicle-rearward portion of the lid assembly 68. The second latch mechanism 76 may permit access to additional functionalities of the floor console 32 that will be discussed in further detail below.

Figure 3:
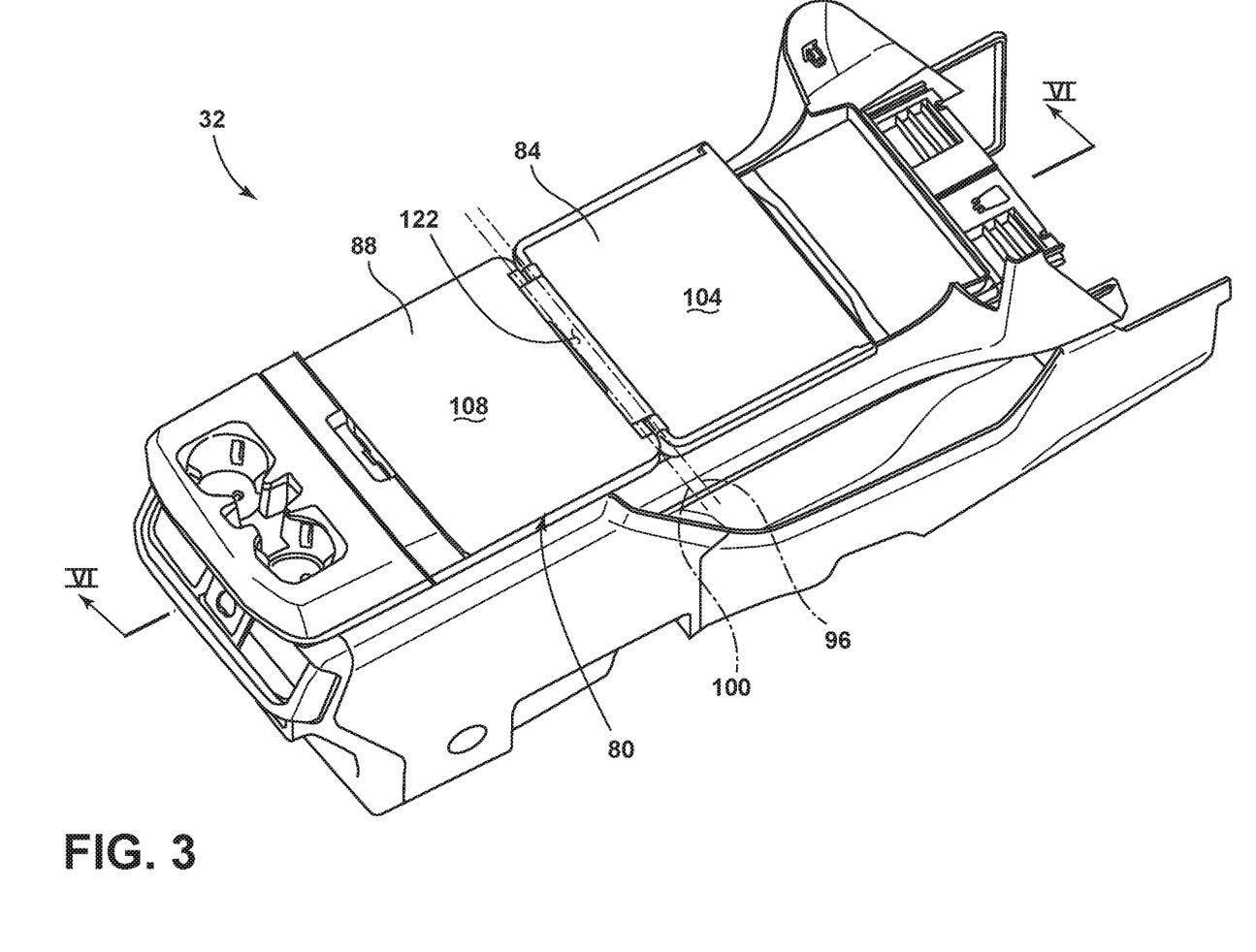
FIG. 3 is a top perspective view of the floor console, illustrating a work surface in a deployed position, according to one embodiment.
Figure 4:
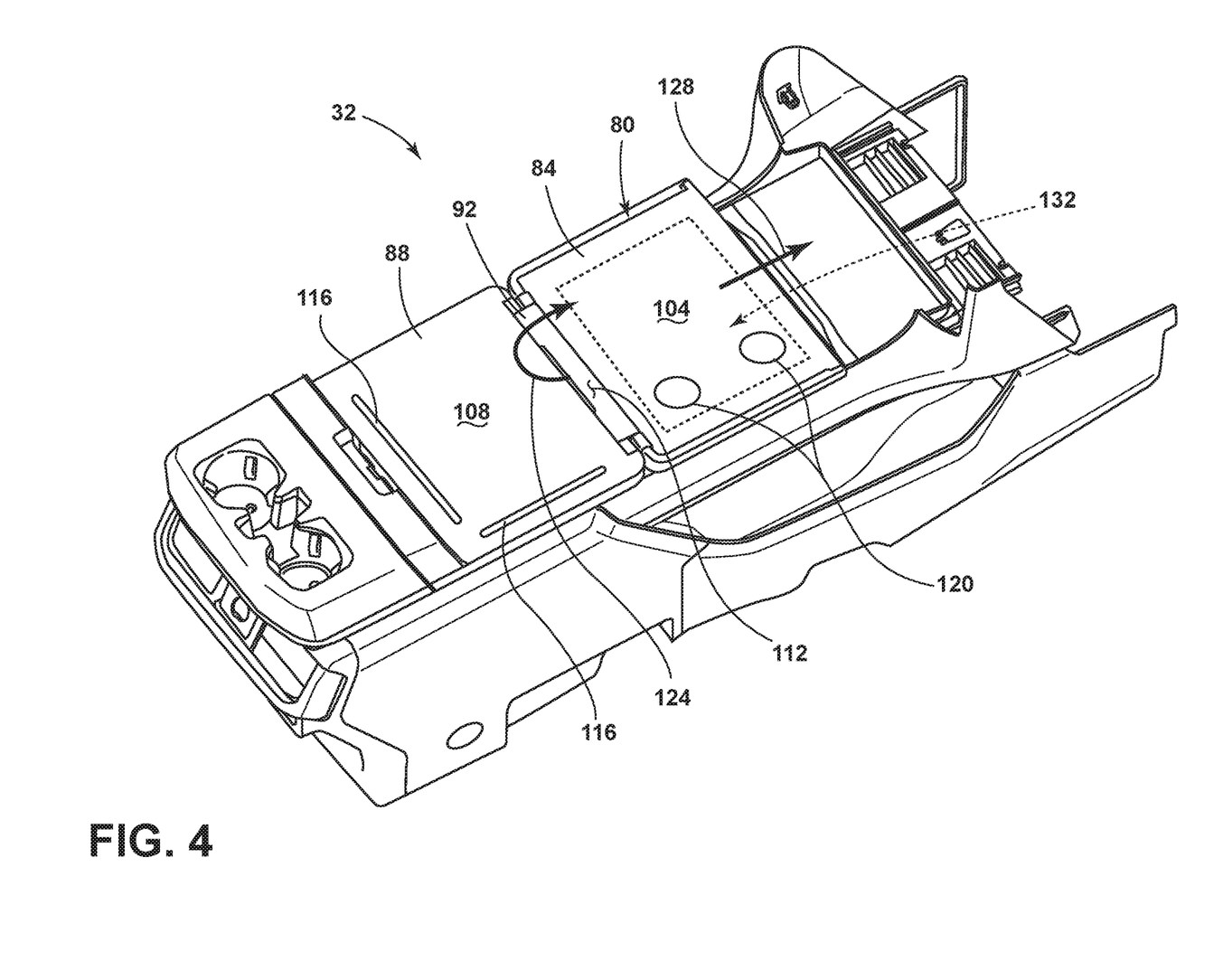
FIG. 4 is a top perspective view of the floor console, illustrating the work surface in the deployed position, according to another embodiment.
Figure 5:
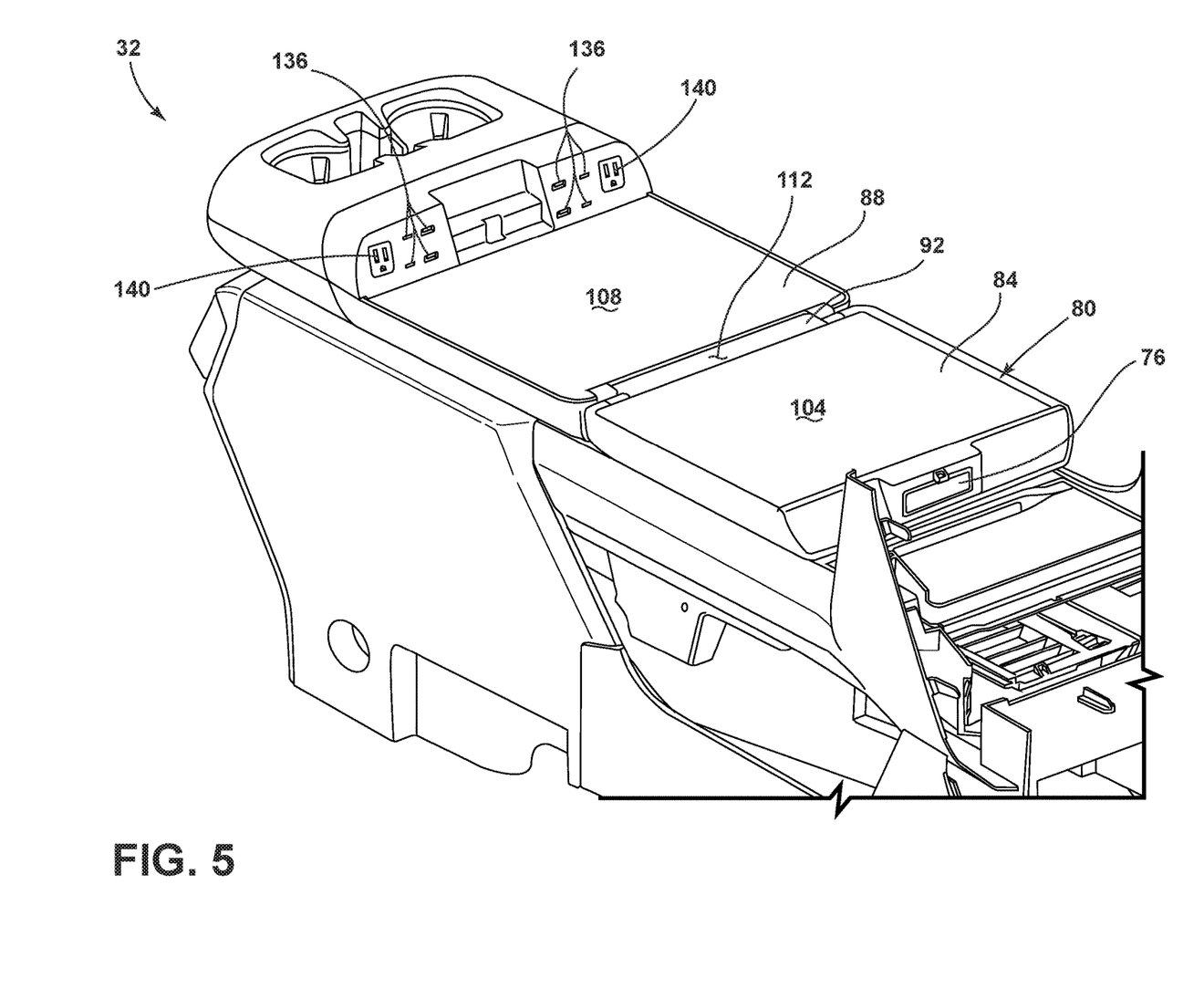
FIG. 5 is a side perspective view of the floor console, illustrating the work surface in the deployed position.

Referring now to FIGS. 3-5, the additional functionality of the floor console 32 that is accessible by the second latch mechanism 76 is a work surface 80 that is deployable. The work surface 80 includes a first leaf 84 and a second leaf 88. The term "leaf," as used herein, is meant to refer to a section of the work surface 80 that forms at least a portion of a work area or presented surface for a user. The term "leaf," as used herein, is also intended to cover support structures to presented surfaces of the work surface 80 that are not directly used by a user, for example, as a writing surface. The first and second leafs 84, 88 are pivotably coupled by a dual-stage hinge 92, which may be accomplished along adjacent edges of the first and second leafs 84, 88. In various examples, the dual-stage hinge 92 may extend along the adjacent edges of the first and second leafs 84, 88 such that a length of the dual-stage hinge 92 is at least fifty percent (50%) of a length of the adjacent edges of the first and second leafs 84, 88. In some examples, the dual-stage hinge 92 may extend along the adjacent edges of the first and second leafs 84, 88 such that the length of the dual-stage hinge 92 is at least seventy percent (70%) of the length along the adjacent edges of the first and second leafs 84, 88. The dual-stage hinge 92 includes a first pivot axis 96 and a second pivot axis 100. The first leaf 84 is movable between a stowed position (FIG. 1) and a deployed position (FIG. 3) relative to the second leaf 88 by pivotable motion about the dual-stage hinge 92. When the first leaf 84 is in the deployed position, a presented surface 104 of the first leaf 84 is substantially coplanar with a presented surface 108 of the second leaf 88. Additionally, a presented surface 112 of the dual-stage hinge 92 may be substantially coplanar with the presented surfaces 104, 108 of the first leaf 84 and the second leaf 88. Accordingly, the first leaf 84, the second leaf 88, and the dual-stage hinge 92 may provide a substantially continuous work area for a user. In various examples, the presented surface 112 of the dual-stage hinge 92 is configured to be utilized as at least a portion of the work area. Said another way, the dual-stage hinge 92 is designed to prevent impediments to a user while using the work area. For example, the user may take advantage of the entire work area, including the presented surface 112 of the dual-stage hinge 92, with little-to-no interruptions while writing on a document placed upon the presented surfaces 104, 108, 112 of the first leaf 84, the second leaf 88, and the dual-stage hinge 92.

Referring again to FIGS. 3-5, in some examples, the first leaf 84 and the second leaf 88 may be made from a translucent material. In such examples, the translucent material may be illuminated by a light source such that the first and second leafs 84, 88 are provided with a backlighting feature that aids in illumination of the work area. The first and/or second leaf 84, 88 may be provided with storage grooves 116 and circular recesses 120. The storage grooves 116 may be utilized, for example, to store writing utensils and the circular recesses 120 may be utilized to retain one or more beverage containers. As depicted in FIG. 4, the first leaf 84 may be deployed from the stowed position by pivotable motion about the dual-stage and 92, as indicated by arrow 124. The first leaf 84 may additionally be slidably coupled to the lid assembly 68, as indicated by arrow 128. Slidable actuation of the first leaf 84 from a retracted position (FIG. 4) to an extended position may reveal a first leaf storage compartment 132. Alternatively, slidable actuation of the first leaf 84 from the retracted position to the extended position may further expand the work area for a user. Placing the first leaf 84 in the deployed position may permit access to one or more charging outlets, such as USB outlets 136, 12V charging outlets, and 110V outlets 140. Alternative outlets or functionalities may be provided in the space occupied by the USB outlets 136 and 110V outlets 140 without departing from the concepts disclosed herein.

Figure 6:
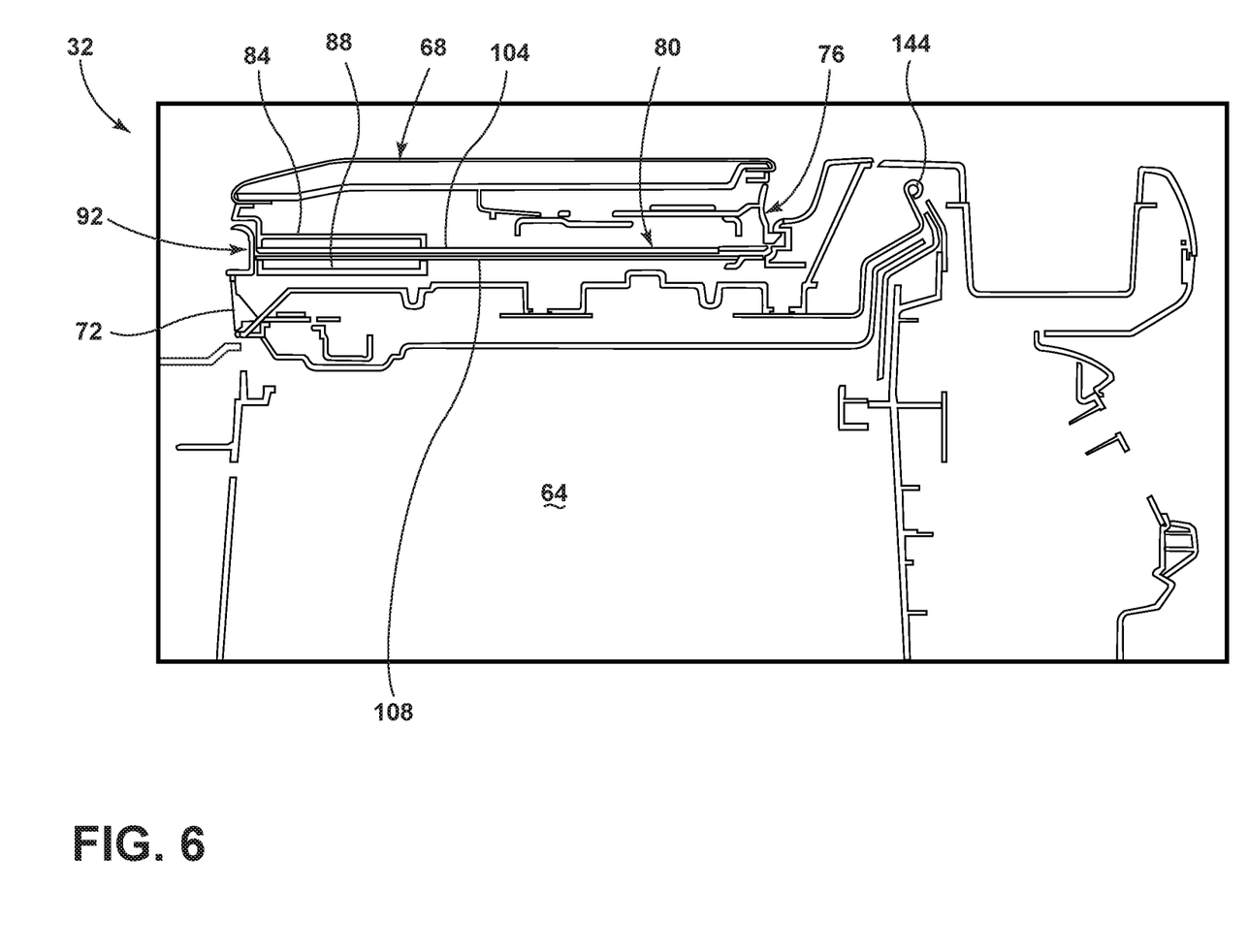
FIG. 6 is a cross-sectional view of the floor console, taken along line VI-VI of FIG. 3, illustrating the lid assembly.

Referring to FIG. 6, the lid assembly 68 covers the main storage bin 64 and is pivotably coupled to the floor console 32. In the depicted example, the lid assembly 68 is pivotably coupled to the floor console 32 by a lid hinge 144. Actuation of the lid assembly 68 between the closed position and the open position may be accomplished by actuation of the first latch mechanism 72. The first latch mechanism 72 may be a center pawl latch, a dual pawl latch, or any other suitable actuatable mechanism. Upon actuation of the first latch mechanism 72, the lid assembly 68 can be lifted away from the floor console 32 in a pivotable fashion about the lid hinge 144 to permit access to the main storage bin 64.

Referring again to FIG. 6, the dual-stage hinge 92 is positioned vertically above the first latch mechanism 72. Upon actuation of the second latch mechanism 76, the first leaf 84 may be pivoted in a vehicle-forward direction away from the second leaf 88 to assume the deployed position of the work surface 80. The first leaf 84 and the second leaf 88 are coupled to an underside of the presented surface 104 and the presented surface 108, respectively. In some examples, a surface area of the first leaf 84 is less than a surface area of the presented surface 104. Similarly, a surface area of the second leaf 88 may be less than a surface area of the presented surface 108. The second latch mechanism 76 may be a center pawl latch, a dual pawl latch, a side-release button, or any other suitable actuatable mechanism.

Figure 7:
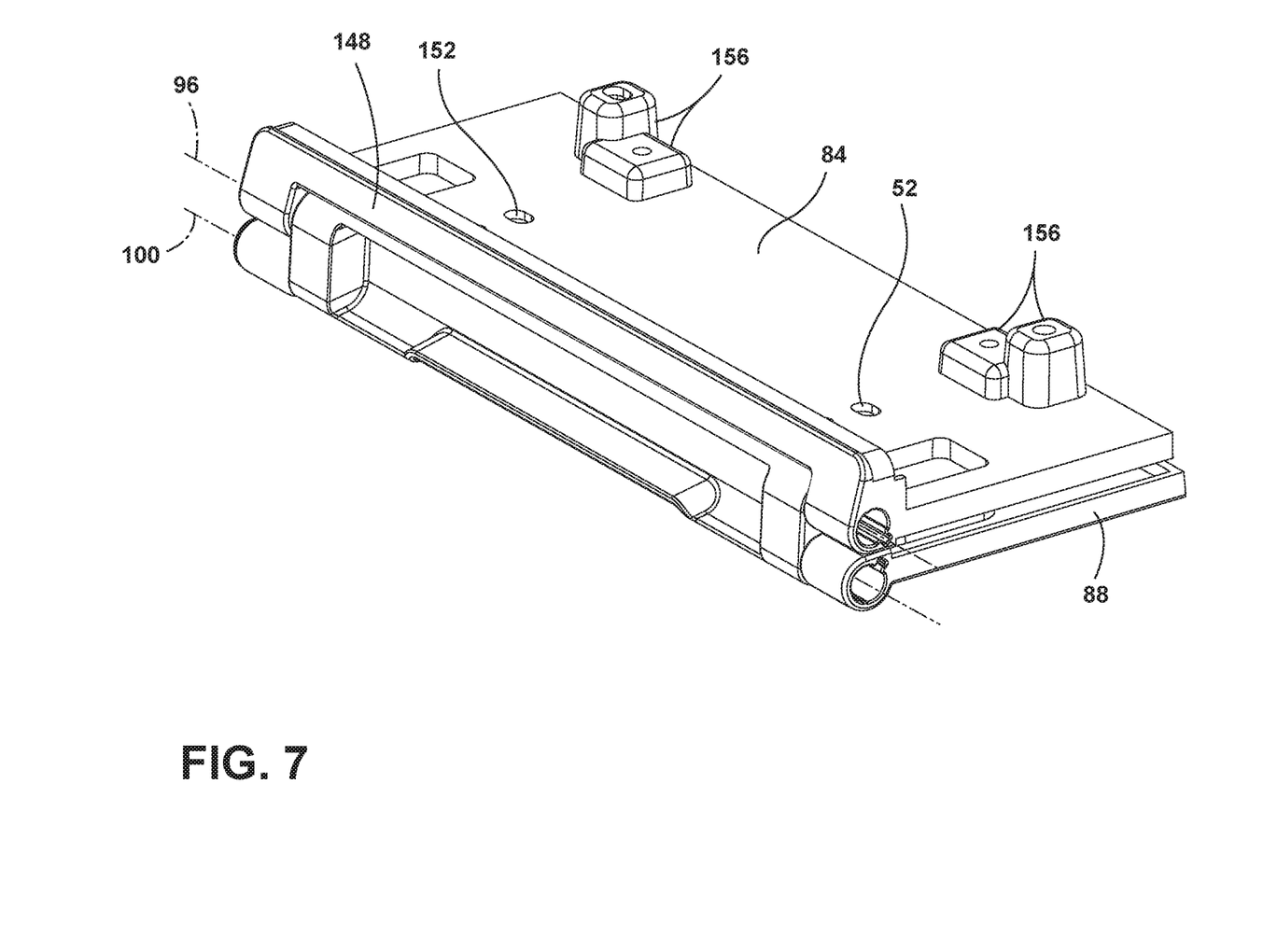
FIG. 7 is a side perspective view of a first leaf, a second leaf, and a dual-stage hinge of the lid assembly, illustrating the operable coupling of the components in a stowed position.
Figure 8:
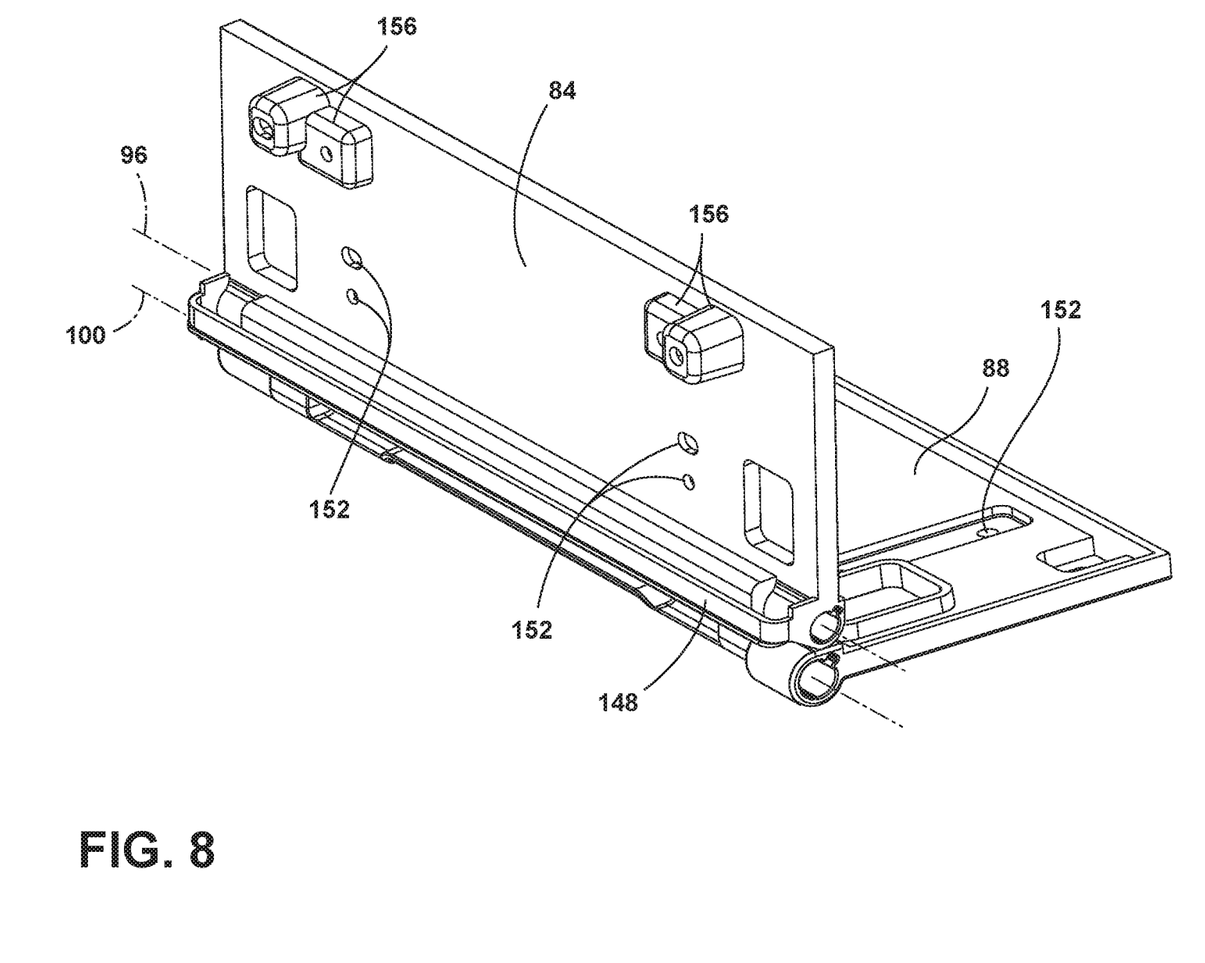
FIG. 8 is a side perspective view of the first leaf, the second leaf, and the dual-stage hinge of the lid assembly, illustrating the operable coupling of the components in an intermediate position.
Figure 9:
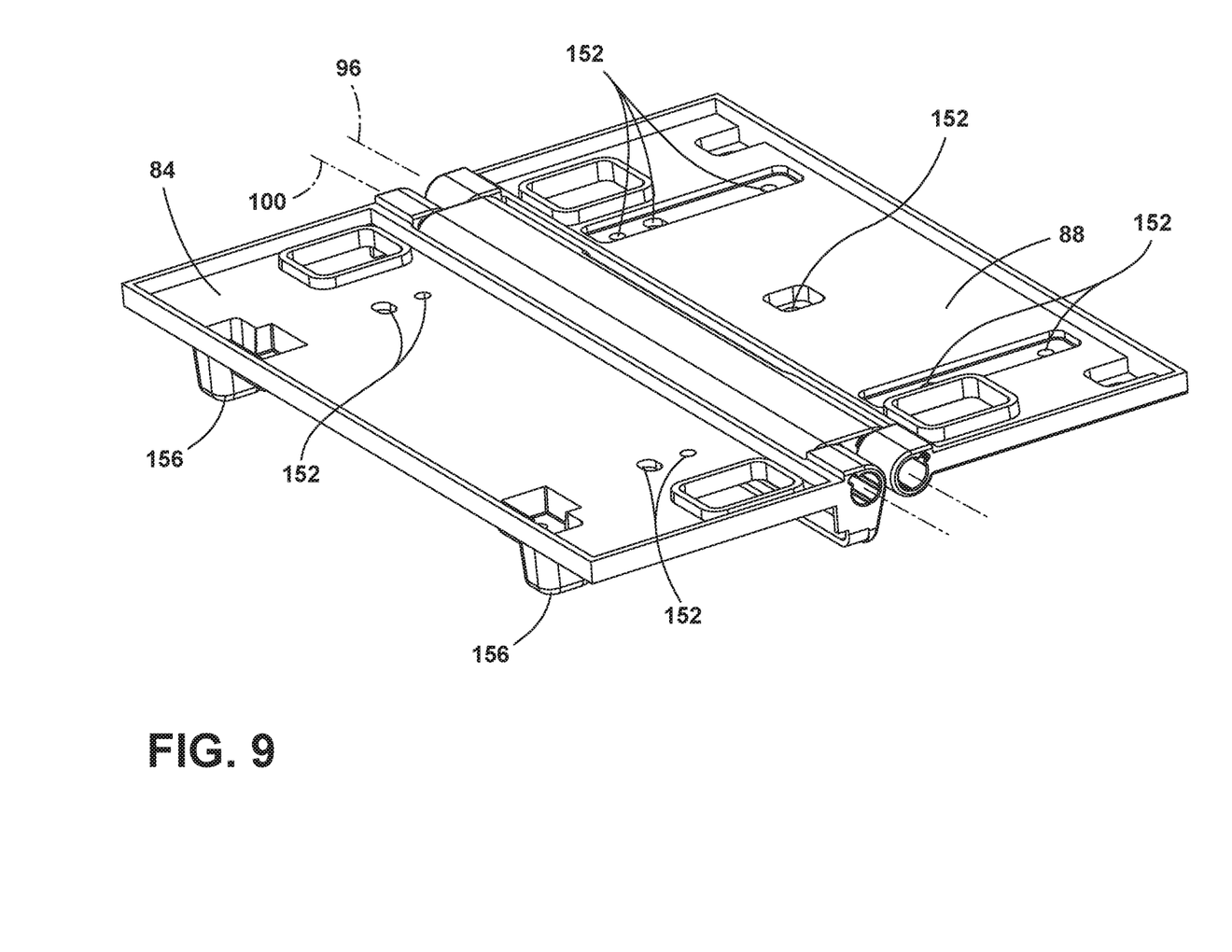
FIG. 9 is a side perspective view of the first leaf, the second leaf, and the dual-stage hinge of the lid assembly, illustrating the operable coupling of the components in a deployed position.

Referring now to FIGS. 7-9, the first leaf 84, the second leaf 88, and the dual-stage hinge 92 are shown transitioning from the stowed position (FIG. 7) to an intermediate position (FIG. 8) and finally to the deployed position (FIG. 9). The first leaf 84 and the second leaf 88 are vertically disposed relative to one another when in the stowed position. Transitioning between the stowed position and the deployed position is accomplished by pivotable motion of the first leaf 84 about the dual-stage hinge 92. The pivotable motion about the dual-stage hinge 92 is accomplished by a first ninety-degree (90°) rotation about the first pivot axis 96 and a second ninety-degree (90°) rotation about the second pivot axis 100 in the same direction as the first ninety-degree (90°) rotation. When the first leaf 84 has completed the first ninety-degree (90°) rotation, a first leaf support bar 148 may be transitioned to a location in closer proximity to the second pivot axis 100 and/or the second leaf 88. In some examples, the first leaf support bar 148 may come into physical contact with a portion of the second leaf 88 such that further pivotable actuation of the first leaf 84 is translated into rotational motion about the second pivot axis 100 and ultimately completion of the second ninety-degree (90°) rotation.

Referring again to FIGS. 7-9, the first leaf 84 and the second leaf 88 may each be provided with one or more fastener apertures 152 that are configured to receive one or more fasteners that may be utilized to couple the presented surfaces 104, 108 to the first leaf 84 and the second leaf 88, respectively. Additionally or alternatively, one or more of the fastener apertures 152 may be utilized to secure the first leaf 84 and/or the second leaf 88 to at least one of the floor console 32 and the lid assembly 68. The underside of the first leaf 84 may be equipped with one or more protrusions 156 that are configured to support the first leaf 84 when the first leaf 84 is placed in the deployed position. The protrusions 156 may work together with the first leaf support bar 148 to transfer weight applied to the first leaf 84, for example by a user, to the structure of the floor console 32. Accordingly, the first leaf support bar 148 and the protrusions 156 may be configured to have a length that corresponds with a height difference between the presented surface 108 of the second leaf 88 and an exterior portion of the lid assembly 68. Said another way, the first leaf support bar 148 and/or the protrusions 156 may provide support to an exterior surface of the lid assembly 68 when the lid assembly 68 is in the closed position while also being configured to provide support to the first leaf 84 and the presented surface 104 when the first leaf 84 is placed in the deployed position. The regions of the first and second leafs 84, 88 that engage with the dual-stage hinge 92 may be provided with torque inserts or pivot pins that couples the first and second leafs 84, 88 to the dual-stage hinge 92 in a pivotable manner. The dual-stage hinge 92, in some examples, may provide a soft open and/or soft close function to protect the various components of the floor console 32 and the lid assembly 68 while also providing a higher-end perception of the floor console 32. The soft open and/or soft close functionality may be provided, for example, by a biasing member, such as a clock spring or a torsion spring. The biasing member may be positioned in the dual-stage hinge 92.

By providing the deployment of the work surface 80 as a two-step or two-stage deployment via the dual-stage hinge 92, the hinge mechanism is able to be housed within a body of the dual-stage hinge 92, thereby allowing the presented surface 112 of the dual-stage hinge 92 to be configured for use as at least a portion of the work surface 80. Conventional hinges that deploy from a stowed or closed position to a deployed or open position with a full one-hundred-eighty-degree (180°) rotation often include the hinge assembly as coupled to the surfaces of the work surface. Accordingly, conventional hinge executions result in the hinge protruding from the surfaces of the work surface and presenting an impediment to a user, for example, as the user writes on a document. Additionally, the dual-stage hinge 92 is configured to provide the presented surface 112 of the dual-stage hinge 92 as substantially coplanar with the presented surfaces 104, 108 of the first leaf 84 and the second leaf 88, respectively, which is often not possible with conventional hinges.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A work surface for a vehicle, comprising:
a first leaf comprising a first presented surface and a first leaf support bar, wherein the first leaf support bar and the first presented surface are provided on opposing sides of the first leaf, and wherein the first leaf support bar provides support to the first leaf when the first leaf is in a deployed position;
a second leaf comprising a second presented surface; and
a dual-stage hinge pivotably coupling the first and second leafs, wherein the dual-stage hinge comprises a hinge mechanism, a body, and a third presented surface, wherein the hinge mechanism is housed within the body such that the first, second, and third presented surfaces are free of perforations by components of the hinge mechanism, wherein the dual-stage hinge comprises a first pivot axis and a second pivot axis, and wherein the dual-stage hinge extends along adjacent edges of the first and second leafs such that a length of the dual-stage hinge is at least fifty percent of a length of the adjacent edges of the first and second leafs.

2. The work surface for a vehicle of claim 1, wherein the first leaf is movable between a stowed position and a deployed position relative to the second leaf by pivotable motion about the dual-stage hinge.

3. The work surface for a vehicle of claim 2, wherein the pivotable motion about the dual-stage hinge is accomplished by a first ninety-degree (90°) rotation about the first pivot axis and a second ninety-degree (90°) rotation about the second pivot axis in the same direction as the first ninety-degree (90°) rotation.

4. The work surface for a vehicle of claim 3, wherein the deployed position of the first leaf results in the first presented surface of the first leaf being substantially coplanar with a presented surface of the second leaf.

5. The work surface for a vehicle of claim 4, wherein the first, second, and third presented surfaces are substantially coplanar when the first leaf is in the deployed position.

6. The work surface for a vehicle of claim 5, wherein the first, second, and third presented surfaces provide a substantially continuous work area.

7. The work surface for a vehicle of claim 6, wherein the third presented surface is configured to be utilized as at least a portion of the work area.

8. The work surface for a vehicle of claim 2, wherein the first leaf and the second leaf are vertically disposed relative to one another when in a stowed position.

9. A floor console for a vehicle, comprising:
a work surface, comprising:
a first leaf comprising a first leaf support bar, wherein the first leaf support bar provides support to the first leaf when the first leaf is in a deployed position; and
a second leafs pivotably coupled to the first leaf by a dual-stage hinge at adjacent edges of the first and second leafs, wherein a length of the dual-stage hinge is at least seventy percent of a length along the adjacent edges of the first and second leafs, the dual-stage hinge comprising first and second pivot axes, wherein the first leaf, the second leaf, and the dual-stage hinge provide substantially coplanar presented surfaces when in a deployed position, wherein the presented surface of the dual-stage hinge forms at least a portion of a work area, and wherein the presented surface of the dual-stage hinge is free of perforations from components of the dual-stage hinge.

10. The floor console for a vehicle of claim 9, wherein the first leaf is movable between a stowed position and the deployed position relative to the second leaf by pivotable motion about the dual-stage hinge.

11. The floor console for a vehicle of claim 10, wherein the pivotable motion about the dual-stage hinge is accomplished by a first ninety-degree (90°) rotation about a first pivot axis and a second ninety-degree (90°) rotation about a second pivot axis in the same direction as the first ninety-degree (90°) rotation.

12. The floor console for a vehicle of claim 9, wherein presented surfaces of the first leaf, the second leaf, and the dual-stage hinge provide the work area as substantially continuous.

13. The floor console for a vehicle of claim 9, wherein the work surface is incorporated into a lid assembly of a main storage bin.

14. The floor console for a vehicle of claim 13, wherein the lid assembly comprises:
a first latch mechanism that releases the lid assembly to permit access to the main storage bin; and
a second latch mechanism that releases the first leaf from a stowed position.

15. A work surface for a vehicle, comprising:
a first leaf comprising a first presented surface and a first leaf support bar, wherein the first leaf support bar and the first presented surface are provided on opposing sides of the first leaf, and wherein the first leaf support bar provides support to the first leaf when the first leaf is in a deployed position;
a second leaf comprising a second presented surface; and
a dual-stage hinge pivotably coupling the first and second leafs, wherein the dual-stage hinge comprises a hinge mechanism, a body, and a third presented surface, wherein the hinge mechanism is housed within the body such that the first, second, and third presented surfaces are free of perforations by components of the hinge mechanism, wherein the dual-stage hinge comprises a first pivot axis and a second pivot axis.

16. The work surface for a vehicle of claim 15, wherein a distance between the first leaf support bar and the second leaf is decreased when the first leaf is transitioned from a stowed position to the deployed position.

17. The work surface for a vehicle of claim 15, wherein the work surface is incorporated into a lid assembly of a main storage bin of a floor console.

18. The work surface for a vehicle of claim 17, wherein the lid assembly comprises:
a first latch mechanism that releases the lid assembly to permit access to the main storage bin; and
a second latch mechanism that releases the first leaf from a stowed position.

19. The work surface for a vehicle of claim 17, wherein the first leaf support bar provides support to the lid assembly when the first leaf is in a stowed position.

20. The work surface for a vehicle of claim 15, wherein presented surfaces of the first leaf, the second leaf, and the dual-stage hinge provide a substantially continuous work area.

\* \* \* \* \*